July 19, 1955 F. BERRY 2,713,309
ROTARY POWER DEVICE OF THE ROTARY ABUTMENT TYPE
Filed March 31, 1951 8 Sheets-Sheet 1

INVENTOR.
FRANK BERRY
BY
Donald W. Robertson
ATTORNEY

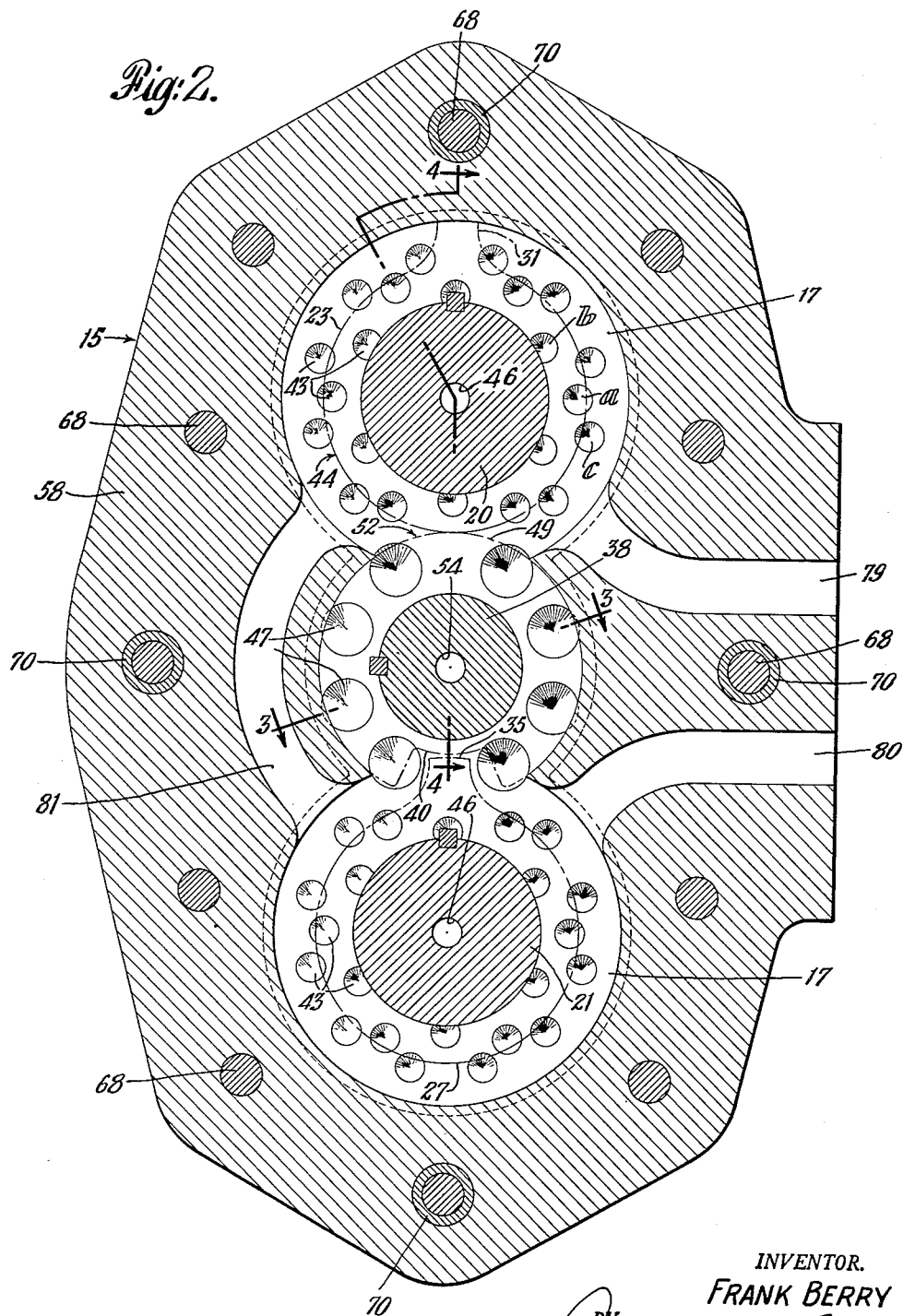

INVENTOR.
FRANK BERRY
BY Donald W. Robertson
ATTORNEY

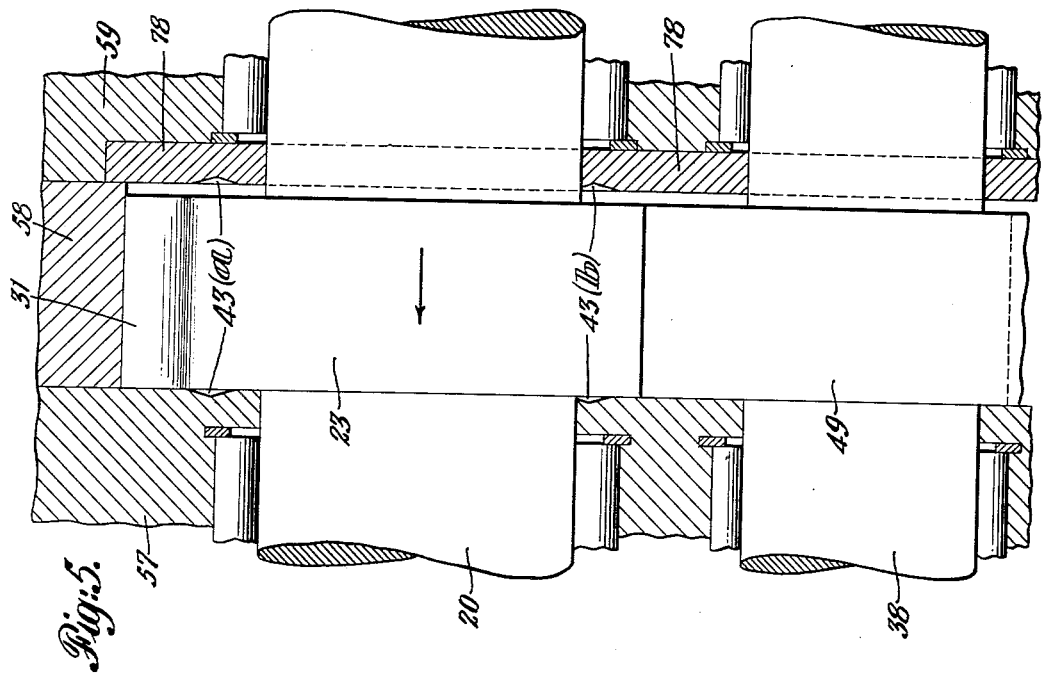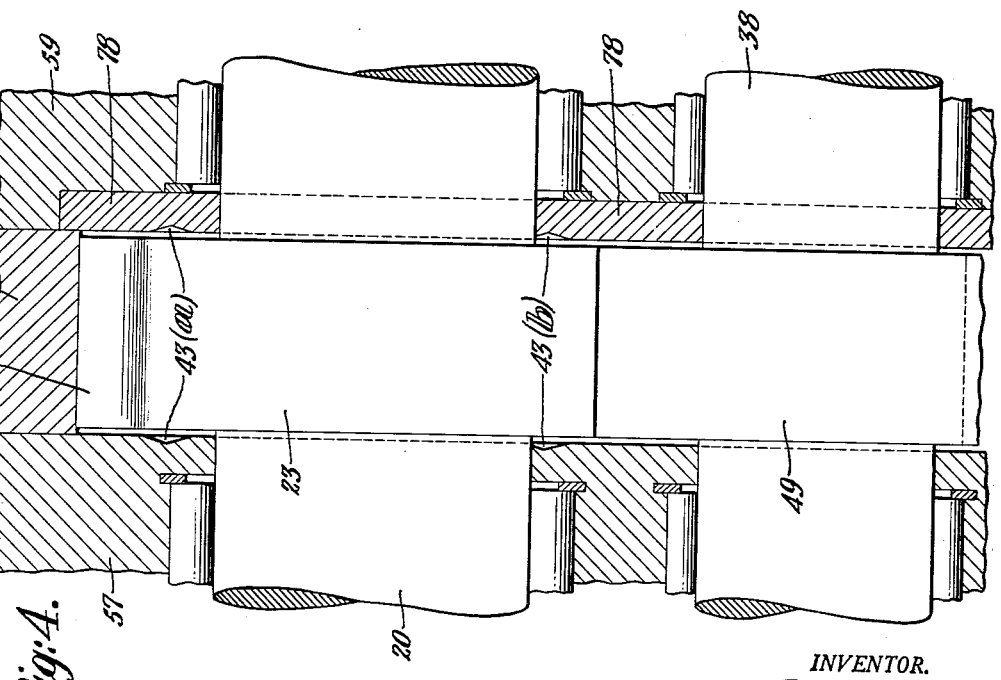

INVENTOR.
FRANK BERRY
BY
ATTORNEY

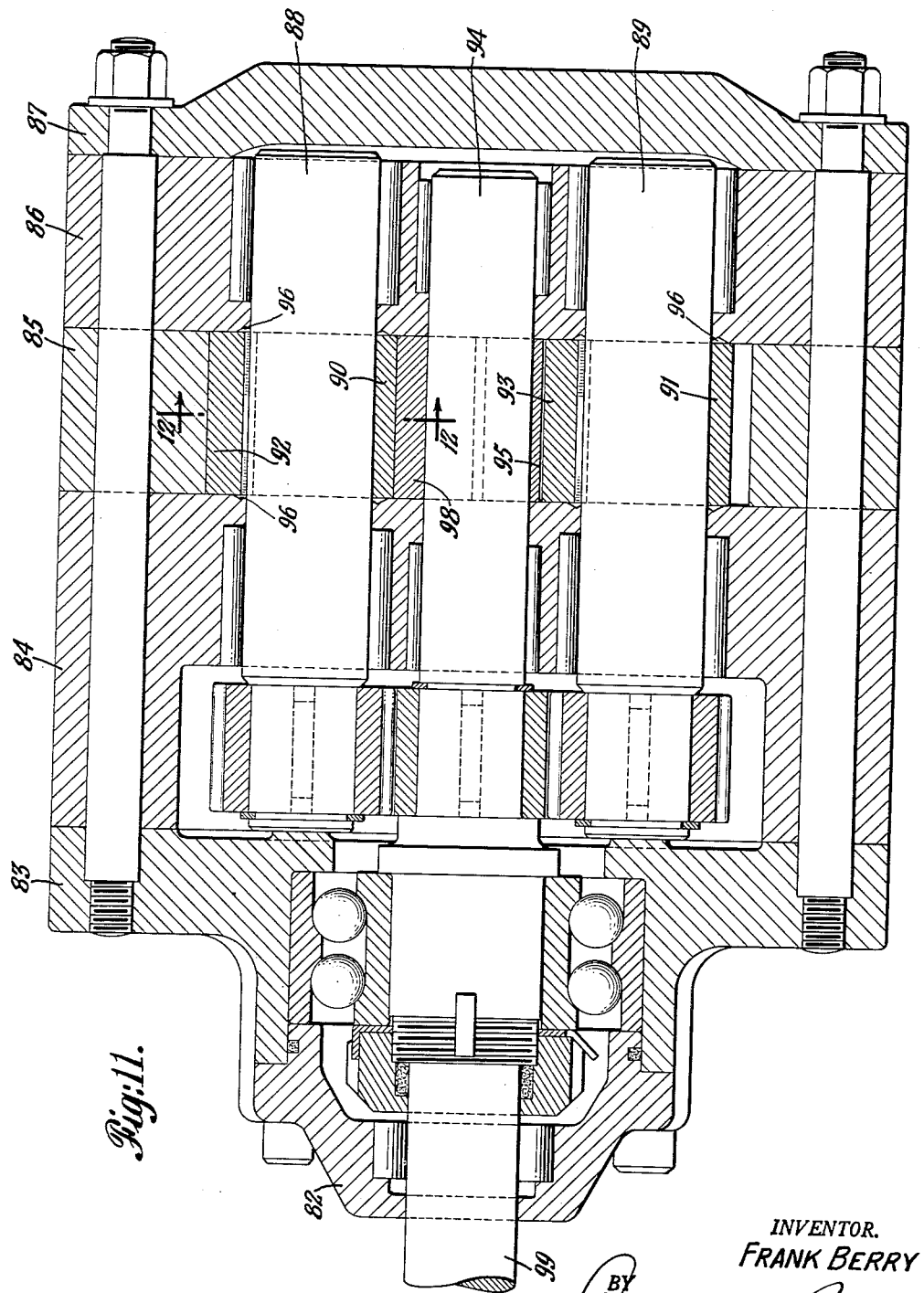

July 19, 1955

F. BERRY 2,713,309

ROTARY POWER DEVICE OF THE ROTARY ABUTMENT TYPE

Filed March 31, 1951

INVENTOR.
FRANK BERRY
BY
Donald W. Robertson
ATTORNEY

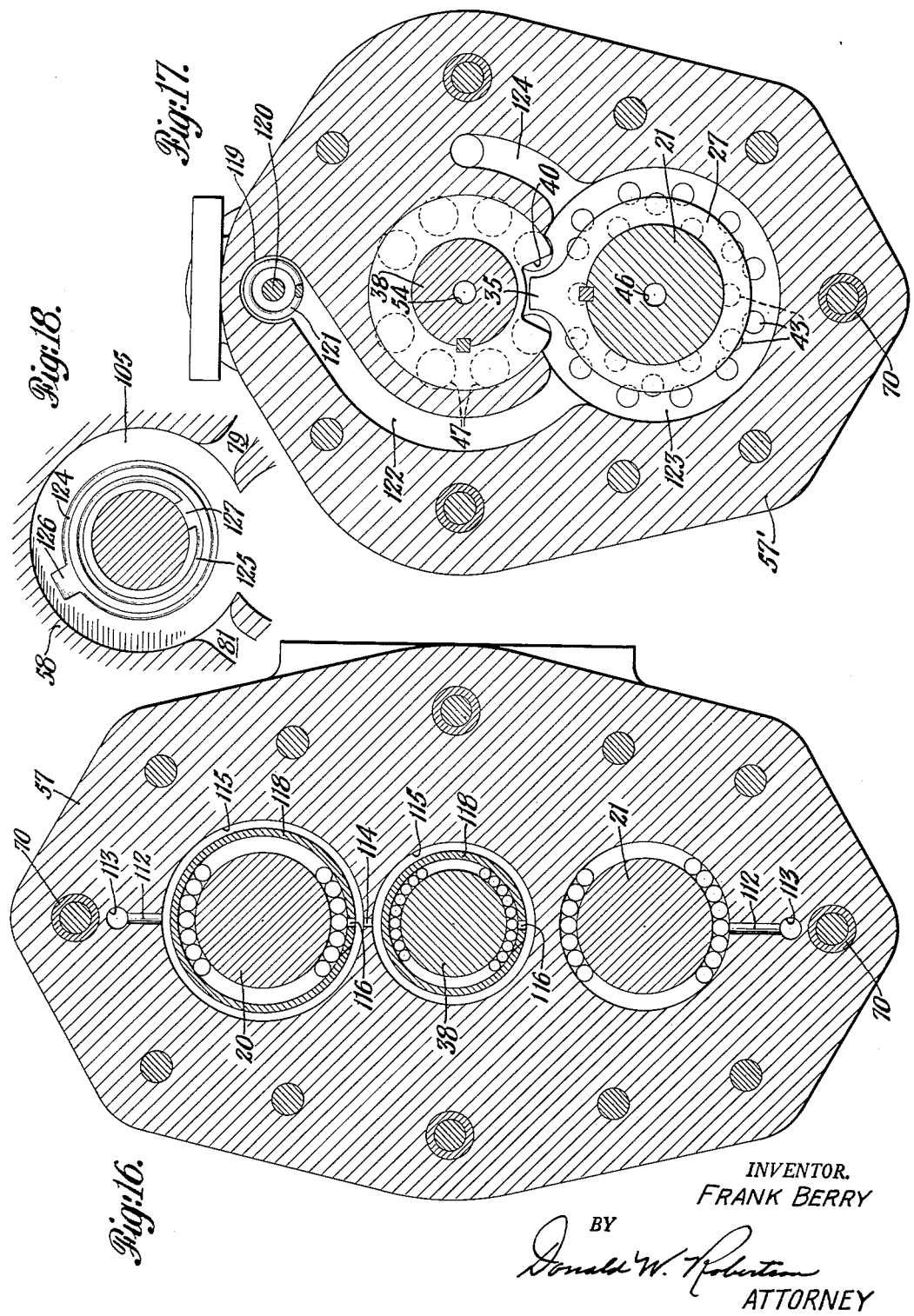

United States Patent Office 2,713,309
Patented July 19, 1955

2,713,309

ROTARY POWER DEVICE OF THE ROTARY ABUTMENT TYPE

Frank Berry, Corinth, Miss., assignor, by mesne assignments, to Oliver Iron and Steel Corporation, Pittsburgh, Pa., a corporation of Pennsylvania Application March 31, 1951, Serial No. 218,670

16 Claims. (Cl. 103—4)

The invention relates to rotary power devices of the rotary piston and abutment type, and is applicable to pumps, motors, transmissions and other devices of the type defined, including units having single or multiple cylinders.

In the case of multiple place units, my invention is useful and advantageous where the cylinders are arranged in line on a common axis, also where the cylinders are arranged on spaced parallel axes in a common plane, and also where a combination of these two arrangements is employed. My invention is useful also in the construction of units in which the cylinders are connected in series, or in parallel, or in series-parallel arrangement, and in the case of parallel connection is especially advantageous where the cylinders are arranged to be put into operation selectively so that certain cylinders are idling while others are operating under load.

In general, it may be stated, therefore, that my present invention is broadly applicable to rotary abutment power units of any of the forms known and used at the present time. In the operation of such power units, a quite serious problem has existed by reason of wear occurring between the piston rotors (and pistons) and the side walls of the annular cylinders in which they operate. End thrust bearings for the piston rotor shafts would seems to offer the normal solution to this problem, but such bearings have not met with practical success in this type of unit, and some other answer was badly needed.

Rotary abutment power units in general comprise a casing having annular cylinders, a rotor shaft carrying piston rotors with pistons slidably arranged to traverse the respective annular cylinders in rotary movement, and a rotary abutment arranged in the casing with its axis parallel to the axis of the rotor shaft, the abutment having recesses to clear the pistons as they pass the abutment. As examples of this general type of power unit, reference is made to my prior Patent No. 2,464,481, granted March 15, 1949, and No. 2,536,486 granted January 2, 1951.

*Summary*

In accordance with my present invention as applied to power units of the class described, a series of recesses are provided in the side walls of the annular cylinders, these recesses being arranged circumferentially around the rotor shaft and at least some of the recesses being positioned to lie partly within the outer circumference of the piston rotor and partly beyond such circumference. In the preferred form of my invention as applied to multiple cylinder or multiple place units, I provide ducts connecting the low-pressure side of the interfaces of each cylinder of the piston rotor with the low-pressure side of the interfaces of the next adjacent cylinder and piston rotor. This construction, in conjunction with the circumferentially arranged recesses, provides both external, or static, pressure balancing between the respective cylinders of the multiple place unit, and internal pressure balancing of the piston rotor (and piston) within each cylinder.

In some cases, the external pressure balancing construction can be used alone, and in other cases (more particularly with a single cylinder or single place unit) the internal pressure balancing construction can be used alone. Generally speaking, in multiple cylinder or multiple place units it is preferable to combine the internal and external pressure balancing constructions and in units operating under high pressure there are cases in which the wear problem can be met satisfactorily only through the conjoint operation of the internal and external pressure balancing constructions.

*Description*

In the drawings which illustrate several embodiments of my invention as applied to pumps:

Fig. 2 is an enlarged vertical transverse sectional view taken as indicated at 2—2 in Fig. 1.

Fig. 4 is an enlarged detail transverse sectional view taken on the line 4—4 of Fig. 2 with the piston rotor and abutment in their normal pressure balancing position and Fig. 5 is a view similar to Fig. 4 but with the piston rotor and abutment shown in temporarily unbalanced position. In these views the clearances between the thrust bearing surfaces or interfaces of the pistons and casing members, and abutments and casing members are shown with considerable exaggeration in order that the operation of the invention may be better understood. From this standpoint, Figs. 4 and 5 may be regarded as being somewhat diagrammatic.

Figure 6:
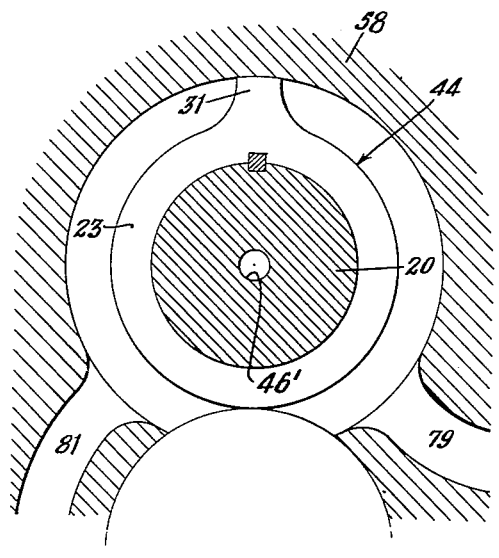

Fig. 6 is a detail transverse sectional view showing one of the cylinders of a pump similar to that illustrated in Figs. 1 to 5 inclusive, embodying my invention in a modified form. In this construction, the external or static pressure balancing construction is used alone.

Figure 7:
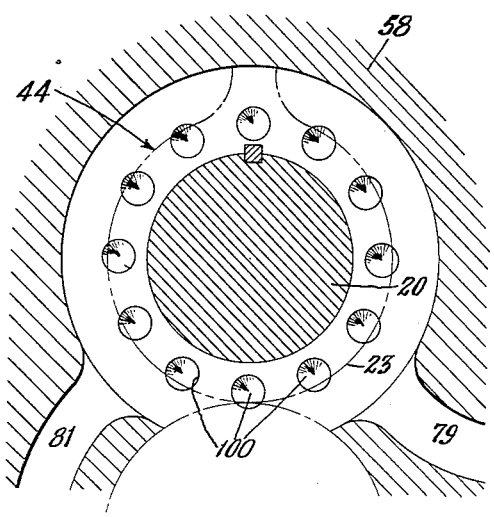

Fig. 7 is a view similar to Fig. 6, illustrating a further modification of the invention in which the internal pressure balancing feature is used alone, and in a somewhat different form.

Figure 8:
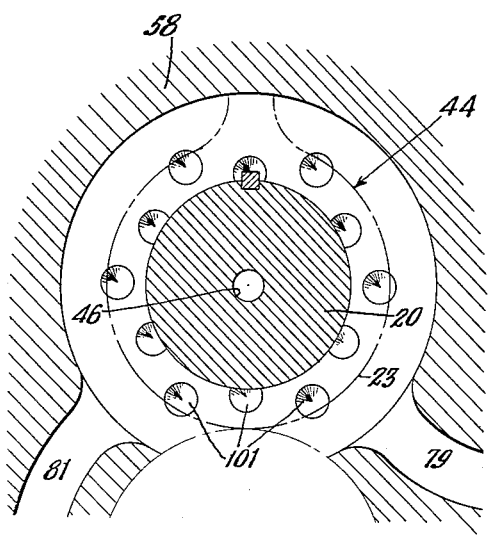

Fig. 8 is a similar view of another modification, combining both internal and external pressure balancing features.

Figure 9:
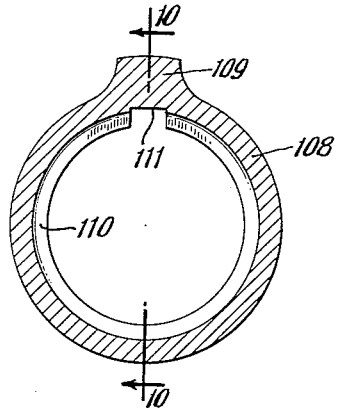
Figure 10:
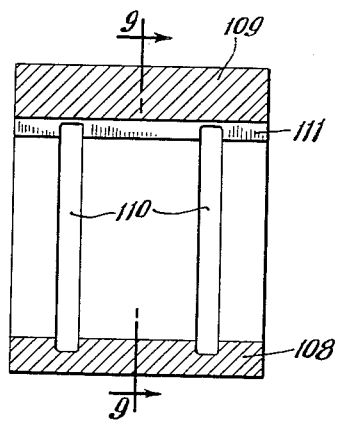

Fig. 9 is a transverse sectional view of a piston rotor taken as indicated at 9—9 in Fig. 10, and Fig. 10 is a central vertical longitudinal sectional view taken on the line 10—10 of Fig. 9.

Figure 12:
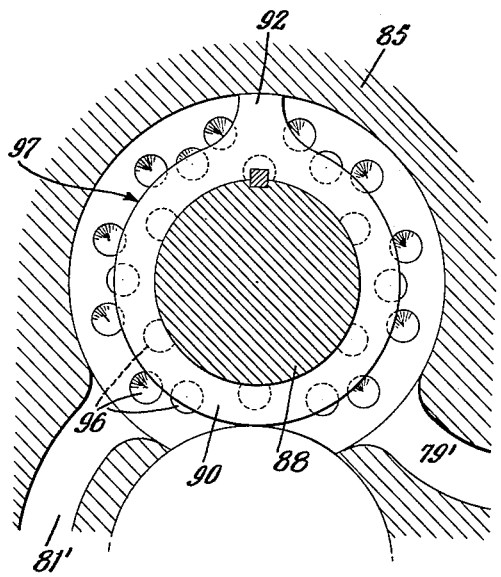

Fig. 11 is a vertical longitudinal cross-sectional view embodying my invention in what I now consider to be its preferred form as applied to a single place pump, and Fig. 12 is a detail transverse sectional view taken on the line 12—12 of Fig. 11.

Figure 13:
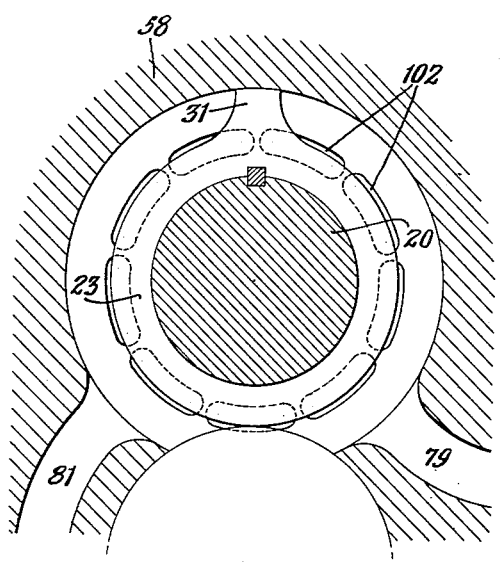

Fig. 13 is a view similar to Fig. 12 illustrating a further modification of the internal pressure balancing construction.

Figure 14:
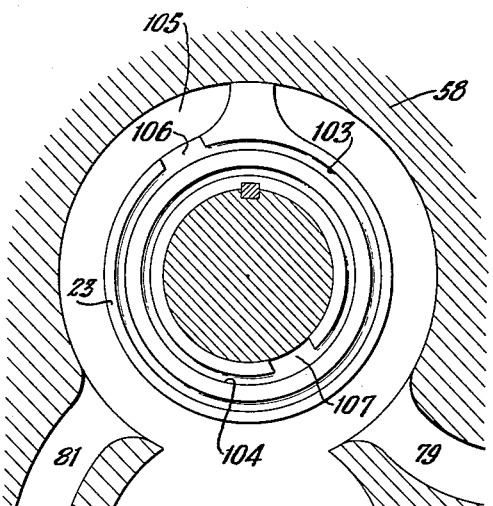

Fig. 14 is a detail sectional view of another modification of the internal pressure balancing construction.

Figure 1:
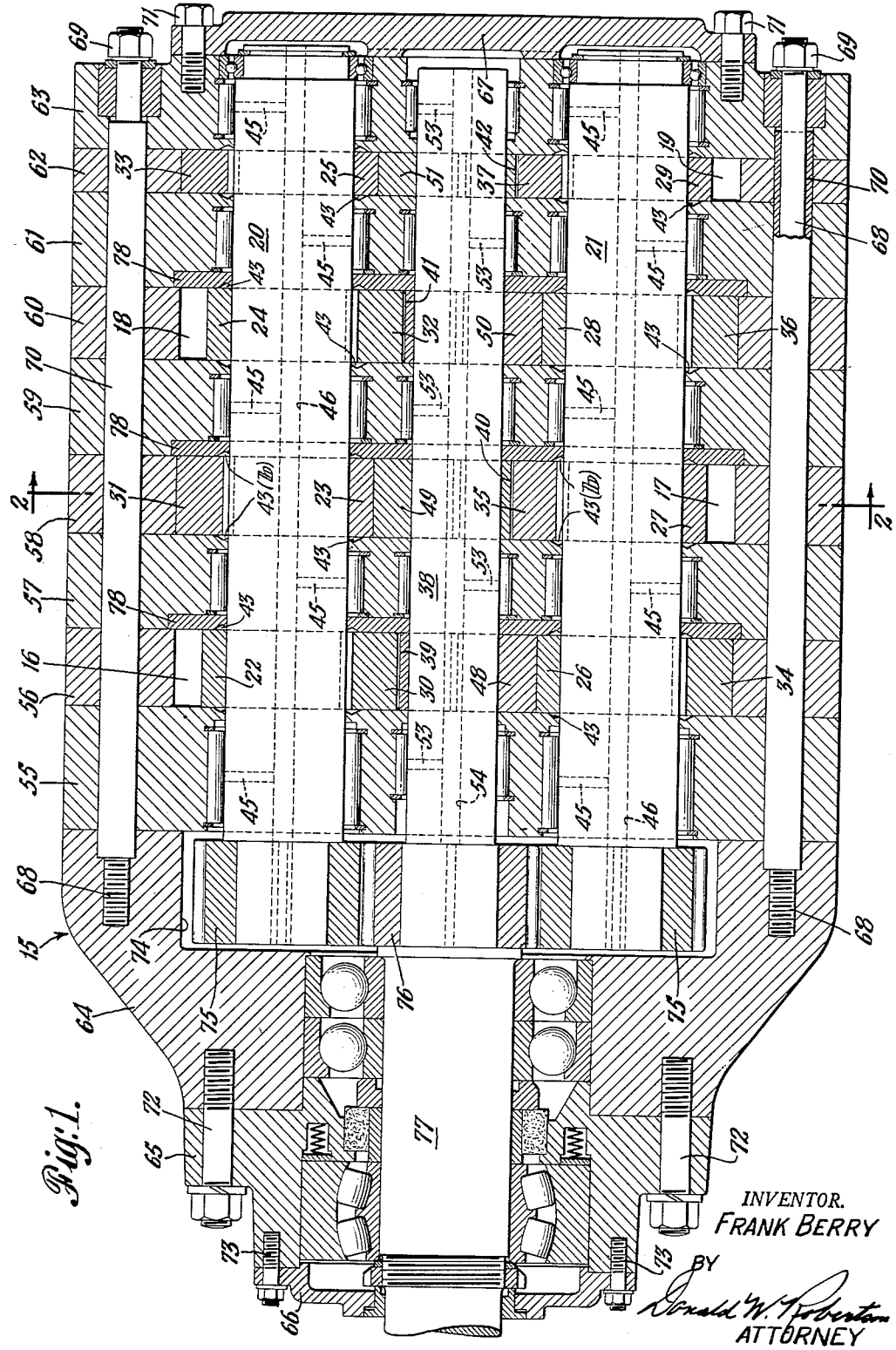
Fig. 1 is a vertical longitudinal cross-sectional view embodying my invention in what I now consider to be its preferred form as applied to a multiple place pump.
Figure 15:
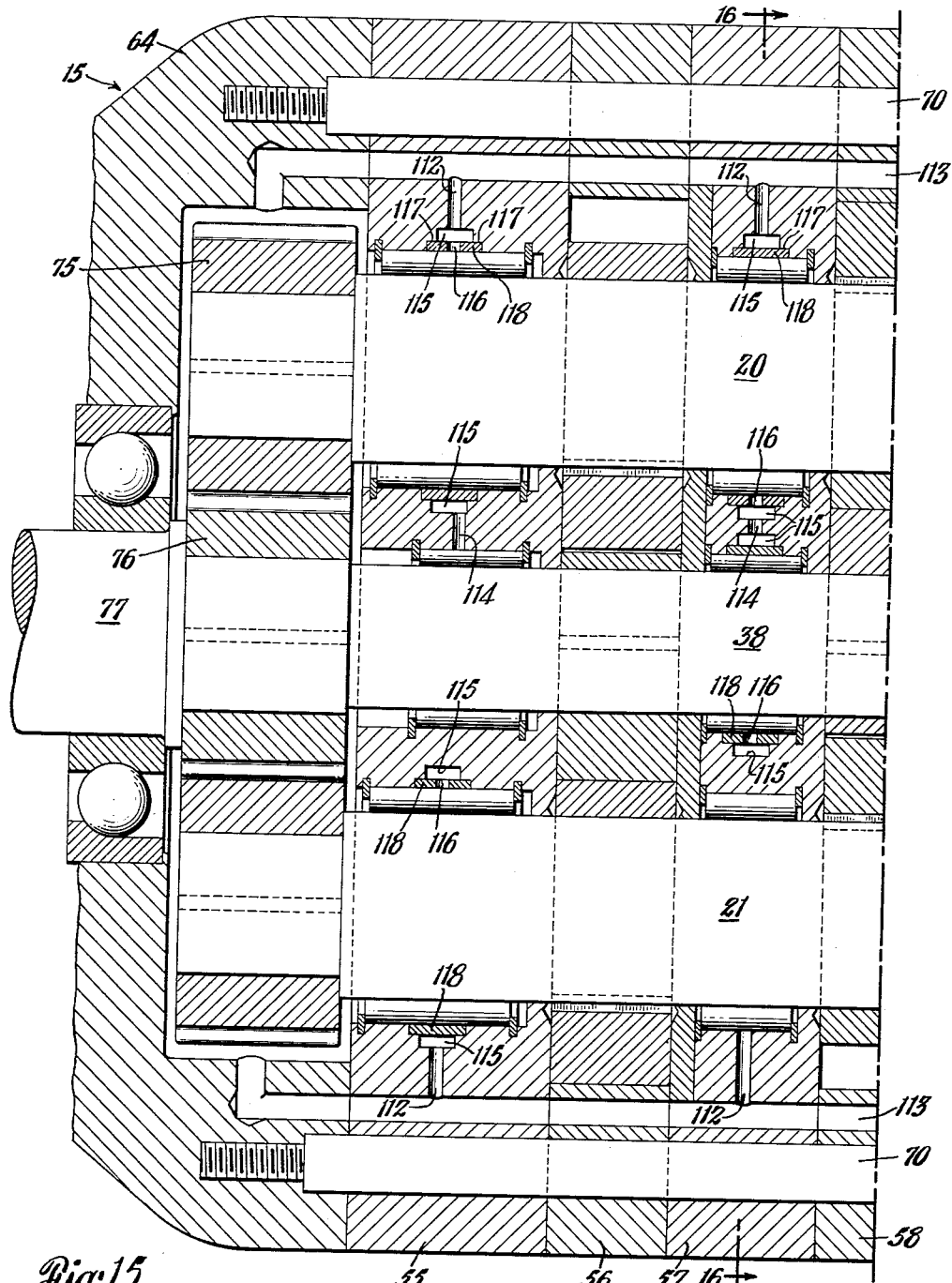

Fig. 15 is a detail sectional view similar to Fig. 1, illustrating a modified construction.

Fig. 16 is a vertical transverse sectional view taken on the line 16—16 of Fig. 15.

Fig. 17 is a vertical transverse sectional view similar to Fig. 2, illustrating another embodiment of the invention.

Fig. 18 is a detail sectional view similar to Fig. 14 illustrating a further modification of the internal pressure balancing construction.

In the description of the drawings to follow, I shall for the sake of simplicity refer throughout to pumps, but it should be understood that the several units disclosed may be operated as hydraulic motors. Therefore, the mechanisms disclosed are properly to be regarded as illustrative of either pumps or motors, or as components of hydraulic transmissions or power converters embodying such pumps or motors.

Referring to Figs. 1 and 2, I will now describe my invention as applied to a multiple place pump (or motor). This unit comprises in its general arrangement a casing 15 made up of a series of plates, this casing having axially-arranged pairs of annular cylinders 16 to 19 inclusive, rotor shafts 20 and 21 carrying piston rotors 22 to 29 inclusive with pistons 30 to 37 inclusive slidably arranged to traverse the respective annular cylinders in rotary movement, a rotary abutment 38 arranged in the casing with its axis parallel to the axes of the rotor shafts 20, 21, the abutment having recesses 39 to 42 inclusive to clear the pistons as they pass the abutment. A series of recesses 43 (Fig. 2) are provided in the side walls of the annular cylinders 16–19, these recesses being arranged circumferentially around the respective rotor shafts and at least some of the recesses being positioned to lie partly within the outer circumference 44 of the respective piston rotor and partly beyond such circumference. Ducts 45 extend from the rotor shaft bearings at each side of each cylinder, and a common passageway 46 connects all of the ducts. Ducts 46 preferably extend entirely through the respective shafts 20 and 21, the connecting ducts 45 extending transversely through the shafts from ducts 46 to the shaft bearings.

In the preferred construction illustrated a series of recesses 47 are provided in the casing opposite the thrust bearing surfaces of the abutment rings 48–51. These recesses also are circumferentially arranged and are positioned so that they lie mainly within the outer circumference 52 of the respective abutment ring and partly beyond such circumference.

The piston rotor rings 22 to 29 inclusive and the abutment rings 48 to 51 inclusive preferably are formed separately from their respective shafts so as to facilitate assembly of the unit and also to permit relative movement between the rings and the shafts for individual centering of the respective rings under the pressure balancing action to be described. However, I do not wish to be limited to this particular construction as it is possible in certain types of unit to employ pistons which are formed as integral parts of the shaft and/or an abutment member in which the recesses to clear the pistons are formed directly in the shaft as distinguished from forming them in separate or integral rings on the abutment shaft.

Ducts 53, 54 in abutment shaft 38 connect the low-pressure side of the bearing surfaces of each abutment ring with the low-pressure side of the bearing surfaces of the next adjacent abutment ring. These ducts, and also the ducts 45, 46 previously described, may either extend through the respective abutment and piston shafts as shown in Figs. 1 and 2, or, if desired, they may extend through the casing as shown in Figs. 15 and 16. In this modified construction, ducts 45, 46 of the embodiment shown in Figs. 1 and 2 are replaced by ducts 112, 113, and ducts 53, 54 are replaced by ducts 114, 115, 116. Annular ducts 115 may conveniently be formed by milling a groove having shoulders 117, and closing the groove by an inserted split ring 118 resting on the shoulders, ducts 116 in this case being formed in the ring 118. In power units of the class described, due principally to leakage, the "end case ppressure" i. e. the pressure in the ends of the unit, is usually somewhat lower than the pressure in the cylinders. Ducts arranged as I have described tend to equalize the pressure between the several pairs of cylinders, and to equalize the pressure between cylinders and the end case.

In the preferred form of multiple pressure pumps selected for illustration, casing 15 is built up of a series of flat plates 55 to 63 inclusive (Fig. 1). The outer cylindrical walls of the cylinders are formed by the plates 56, 58, 60 and 62 and the side walls of the cylinders are formed by the plates 55, 57, 59, 61 and 63. The casing assembly is completed by end case members 64—67. Casing members 55 to 64 inclusive are secured together in proper alignment by means of a series of stud bolts 68 and nuts 69, these bolts extending through aligned openings in the several casing members and being screw threaded into end casing member 64. As may be seen in Fig. 2 a number of the bolts 68 extend through aligning sleeves 70. End casing members 65, 66 and 67 are suitably secured to the assembly by means of cap screws or stud bolts 71, 72, 73. Casing member 64 is recessed at 74 to receive pinions 75 fixed to the ends of rotor shafts 20 and 21, and pinion 76 fixed to the end of abutment shaft 38. In the embodiment illustrated, pinions 75 and 76 are intermeshed to gear the rotor and abutment shafts together in 1 to 1 ratio. End case members 64, 65 and 66 enclose suitable bearings and stuffing box structure as clearly shown in Fig. 1, and abutment shaft 38 is extended at 77 through this bearing structure and beyond the end of the casing 15, forming the drive shaft of the unit. It will be understood that in the case of a pump this drive shaft is driven from an external source of power whereas in the case of a motor this shaft is the driven shaft of the hydraulic motor which in this case constitutes the prime mover. Details of the bearing and stuffing box structure need not be described, as these may be of any well-known construction. Suitable anti-friction bearings may, if desired, also be provided in intermediate plate members 55, 57, 59, 61 and 63 of the casing, such as the roller bearings clearly shown in Fig. 1 for the rotor and abutment shafts. These bearings are retained by plate-like rings 78 seating in counterbored recesses in plate members 57, 59, and 61. Where this construction is employed, some of the recesses 43 and 47 previously described will be formed in retaining rings 78 and the remainder of said recesses will be formed in the plates 57, 59, and 61.

Referring particularly to Fig. 2 it will be observed that in the construction described each "place" of this multiple place unit comprises two cylinders 17 connected together in series. Fluid inlets and outlets 79 and 80 (either one may be the inlet and the other the outlet, depending upon the direction of rotation or depending upon whether the unit is being operated as a pump or as a motor) communicate with the respective cylinders as shown in Fig. 2 and the fluid discharge from one cylinder passes into the other cylinder through a passage 81 extending around the abutment 38. With the position of the parts being as shown in Fig. 2, the piston 35 of the lower cylinder is passing through recess 40 in the abutment while piston 31 of the other cylinder is in the middle of its power stroke. After the shafts have rotated 180 degrees from the positions shown, piston 31 will clear through abutment recess 40 while piston 35 will be in the middle of its power stroke. Piston 35 passes the fluid inlet (or outlet) to begin its power stroke at substantially the same moment that piston 31 reaches the end of its power stroke. Thus each piston is operating for approximately 50% of the time and during the time that the other piston is valving through the abutment. Each piston in this way valves the other piston, and a continuous stream of liquid is caused to flow through the unit with a minimum of pulsation. This feature is described more fully and is claimed in my co-pending application for patent, Serial No. 123,503, filed October 25, 1949, now Patent No. 2,614,503. My present invention is not confined in its application to this particular type of unit but may be applied also to the type of unit shown for example in my prior Patent No. 2,536,486 granted January 2, 1951. Its application to such a unit is illustrated in Fig. 17, which is a view corresponding to Fig. 2 of said patent. The fluid inlets and outlets 79—80 of the several pairs of cylinders, or several places, of the unit here described, are connected through suitable manifolds to an external source of fluid pressure or to a device utilizing fluid pressure, as the case may be, and depending upon whether the unit is being operated as a pump or as a motor. The unit may be designed for simultaneous operation of all of the cylinders in parallel or it may be designed for selective operation of any number of the pairs of cylinders as may be desired to meet a given load condition. This selective operation may be controlled either manually, or automatically as for example with the use of the type of automatic control disclosed and claimed in my Patent No. 2,536,486 aforesaid. This control is shown at 119, 120, 121 in Fig. 17, 119 being a cylindrical valve chamber connected by passages 122 to the outlets of the respective parallel annular cylinders 123, said valve chamber 119 corresponding to valve chamber 43 shown in Fig. 2 of my prior patent aforesaid. Valve piston rod 120 and helical valve spring 121 in Fig. 17 hereof correspond to valve piston rod 40 and helical valve spring 28 in Fig. 2 of said patent (see also Fig. 1 thereof). Inasmuch as these fluid controls do not form a part of my present invention, it will be unnecessary to describe them in more detail here.

*Internal pressure balancing*

Figure 3:
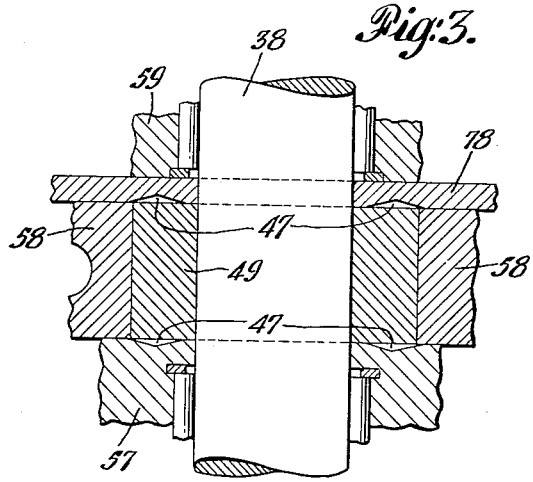
Fig. 3 is a detailed sectional view taken on the line 3—3 of Fig. 2.

Referring again to Fig. 2, it will be observed that the series of recesses 43 are positioned at varying distances from the axis of the rotor shaft. In the particular arrangement shown these recesses are arranged in three circular patterns represented at *a*, *b*, and *c*. The radial spacing of the recesses *a* is such that they lie mainly within the outer circumference 44 of piston rotor 23 and partly beyond such circumference. The radial spacing of recesses *b* is such that they lie entirely within such circumference and extend inwardly to intersect the circumference of the rotor shaft 20. The radial spacing of recesses *c* is such that they lie mainly outside the outer circumference 44 of the rotor and partly within such circumference. Thus we have a series of circumferentially arranged recesses positioned at varying distances from the axis of the rotor shaft. I have found that it is advantageous that the recesses *a* and *b* be positioned so that portions of such recesses will intersect a common circle having the rotor axis as a center, as this arrangement helps to eliminate any foreign particles which may be present in the liquid passing through the unit. It will be noted that portions of recesses *a* and *c* likewise intersect a common circle having the rotor axis as a center. I prefer that the recesses be in the shape of a flat cone as shown in Fig. 3.

An important feature of my invention consists in the arrangement of recesses *a* so that they lie mainly within the outer circumference 44 of piston rotor 23 but also extend partly beyond such circumference. With this arrangement, when the unit is operating at pressures which are sufficiently high to squeeze out the liquid film between the interfaces of the piston rotor rings and one of the side walls of the cylinders when the piston rotor occupies the unbalanced position diagrammatically indicated in Fig. 5, pressure of the liquid within the cylinder is transmitted to the recesses *a* by reason of the communication with the cylinder afforded by that portion of the recesses which extends beyond outer circumference 44 of the rotor. This results in a tendency to equalize the pressure on the two sides of the piston rotor, causing it to assume the balanced operating position indicated diagrammatically in Fig. 4.

In the case of a pump for liquids of low viscosity, it is possible that the piston rotors may come to rest in the position indicated diagrammatically in Fig. 5. Assuming a construction in which the recesses 43 of my present invention are not present, and with the position of the rotor ring being that shown in Fig. 5, when the unit is placed in operation and pressure is built up within the pump cylinder, this pressure tends to hold the rotor ring and piston in the unbalanced position shown in Fig. 5 by reason of the absence of a liquid film on that side which is at the left in Fig. 5. Thus the liquid pressure is not freely transmitted to the left hand side of the rotor ring and piston. Under this condition the rotor ring and piston are positively urged against the left cylinder wall, i. e., the wall of plate member 57, and since there is no liquid film between this wall and the piston rotor a severe wearing condition is created. Let us assume for example that the discharge pressure from the pump is 3,000 pounds per square inch (p. s. i.). Experience shows that the internal pressure in the pump will average approximately one-half the discharge pressure, or 1,500 p. s. i. so that the average pressure tending to move the piston in Fig. 4 would be approximately 2,250 p. s. i. acting in either direction. However, in Fig. 5 the pressure tending to move the piston toward the left wall into contact with cylinder plate 57 would be 2,250 p. s. i., acting only from that side of the piston rotor and piston where a clearance exists. This pressure acts on the piston during the high pressure part of its operating cycle. Also a similar condition will exist during that part of the cycle in which the piston is idling, by reason of the leakage pressure from the inside of the pump. Consequently, there is little opportunity for the liquid film to build up between the interfaces of plate 57 and the rotor ring and piston assembly 23, 31. However, with the recesses 43 located in position *a* as I have described above, communication is always provided between these interfaces and the cylinders so at all times it is possible to build up liquid pressure between the contacting faces of the piston rotor and cylinder walls. This action is further assisted by the flat conical shape of the recesses 43, for as the piston rotor turns at high speed the liquid is trapped within the recesses and driven up the inclined bottom of the recesses due to cohesion between the liquid and the metal surface of the rotor, creating a wedging action. The result is to bring the piston rotor into the pressure balanced position shown in Fig. 4. I prefer that the angle between the cylinder wall and the conical base of the recesses 43 be between 5 and 11 degrees. However, the recesses 43 may be made in the form of a portion of a sphere, or in other forms. Regardless of the form of the base of the recesses, I consider it particularly advantageous to have the base of the recess sloping or curved in a circumferential direction so that there will be a wedging action between this surface and the bearing surface of the rotor ring and piston in order to provide the action described above, in which the liquid is trapped within the recesses and driven up the inclined bottom of the recesses due to cohesion between the liquid and the metal surface of the rotor. In the example stated, those of the recesses 43 which are positioned as indicated at *b* are open to the inside of the rotor at the shaft and the pressure at this point would be substantially the same as the end case pressure, or 1,500 p. s. i., while those of the recesses which are in the *a* position are open to the discharge pressure of the pump which in this case would be 3,000 p. s. i. Those of the recesses which are in the *c* position take in a part of the area of the piston as it passes over such recesses, and are likewise open to the discharge pressure of 3,000 p. s. i. Now with the piston in the unbalanced position shown in Fig. 5, the clearance between the piston rotor and side wall of the cylinder is all on one side, i. e. at the right as viewed in this figure. The pressure cavities provided by recesses 43 each then become a closed vessel insofar as their internal pressure is concerned with an entrance to these recesses in the *a* and *c* positions at 3,000 p. s. i. and an entrance to the recesses in the *b* position of 1,500 p. s. i. This reduces the amount of unbalance between the two sides of the piston and piston rotor. The amount of this reduction in the unbalance is such that a balanced condition is automatically restored in operation of the unit. In cases where the sloping surface is provided at the base of the recesses, the balancing action is assisted by the wedging action previously described so that there is a conjoint action between the communicating closed vessels provided by the recesses and the wedging action of their sloping bases.

Without intending to be limited thereby, but in order to further assist others in practicing my invention, I may state here that in one particular pump unit of approximately 10 H. P. good results were obtained by making the total area of those portions of recesses 43 in the *b* and *c* positions which lie opposite the bearing face of the rotor ring equal to 40% of such bearing area, and with the recesses 43 in the *b* position having an area equal to 20% of such bearing area. In this example we thus have 60% of the total bearing surface covered by the recesses. I also have found that good results are obtained when the recesses in the *c* position are made approximately equal in width to one-half of the width of the intercepted portion of the piston.

Referring now to Figs. 11 and 12, I shall describe a modified form of my invention as applied to a single place unit having two co-planar cylinders connected in series. The two co-planar cylinders will be understood to have inlets and outlets substantially as has been described with reference to the passages 79, 80 and 81 of Fig. 2. In Fig. 12, passages 79¹ and 81¹ correspond respectively to passages 79 and 81 in Fig. 2. Referring more particularly to Fig. 11, this single place unit comprises a casing built up of members 82 to 87 inclusive bolted together in a manner similar to that which has already been described with reference to the unit shown in Figs. 1 to 5 inclusive, rotor shafts 88, 89 carrying piston rotors 90, 91 with pistons 92, 93 slidably arranged to traverse the respective annular cylinders in rotary movement, a rotary abutment 94 arranged in the casing with its axis parallel to the axes of the rotor shafts, said abutment having recesses 95 to clear the pistons as they pass the abutment, a series of recesses 96 being provided in the side walls of each of the annular cylinders, these recesses being arranged circumferentially and at least some of the recesses being positioned to lie partly within the outer circumference 97 of the respective piston rotor and partly beyond such circumference. The arrangement of the recesses 96 may be the same as the arrangement which has been described in detail with reference to Fig. 2. The portion of the abutment 94 which contains the recesses 95 may be formed as a separate abutment ring 98 and has been so shown in the drawings. The rotor shafts 88 and 89 are geared to the abutment shaft in substantially the same manner as has already been described with reference to Fig. 1, and suitable antifriction bearings may be used as clearly shown in Fig. 11, together with a suitable gland to provide a liquid seal at the point where the shaft is extended through the end casing. Extension 99 of the abutment shaft is driven by a source of external power where the unit is to be used as a liquid pump, and where the unit is to be used as a motor, shaft 99 is connected to the mechanism which is to be driven. In this embodiment of my invention recesses 96 provide internal pressure balancing and the operation is the same as has been described with reference to the multiple place unit of Figs. 1–5.

Fig. 6, which is a partial transverse sectional view similar to the upper part of Fig. 2, illustrates a further modification of my invention in which the external balancing feature is employed alone. This construction is primarily designed for use in multiple place units in order to balance the pressure between the several places of such units. The construction of this unit insofar as the external or static pressure balancing is concerned may be the same as has been described with reference to Figs. 1–5, duct 46¹ corresponding to duct 46 previously referred to. In other words, the construction may be the same as the unit of Figs. 1–5 except that the recesses 43 are not present.

Fig. 7 illustrates a still further modification in which the internal pressure balancing recesses 100 are all arranged at the same distance from the rotor axis, the construction otherwise being the same as has been described. The position of recesses 100 is substantially the same as the *a* position in Fig. 2, i. e. they lie mainly within the outer circumference 44 of the rotor and extend slightly beyond such circumference. The area represented by those portions of recesses 100 which lie opposite the bearing faces of the rotor preferably are substantially equivalent to the corresponding area represented by those of the recesses 43 in Fig. 2 which are in the *a* and *b* positions. This construction may, if desired, be augmented by the external or static pressure balancing construction previously described, this being particularly desirable in the case of multiple place units.

Fig. 8 illustrates a still further modification of my invention in which the recesses 101 are arranged at varying distances from the axis of the rotor shaft, occupying positions corresponding to the *a* and *b* positions in Fig. 2. In this form there are no recesses corresponding to those occupying the *c* position of Fig. 2.

Fig. 13 illustrates a still further modification in which pressure balancing recesses 102 are elongated and occupy positions corresponding to the *a* position of Fig. 2.

Fig. 14 illustrates a further modification in which the *a* position recesses are replaced by an annular groove 103, and the *b* position recesses are replaced by another annular groove 104. Groove 103 is arranged in communication with the cylinder 105 by means of a radial passage 106, and groove 104 is arranged in communication with the inner bore of the rotor by a radial passage 107. If desired, grooves 103 and 104 may be formed in the bearing faces of the side walls of the cylinder instead of being formed in the rotor ring as shown, and suitably connected to high and low pressure inlets. This further modification is illustrated in Fig. 18, wherein the *a* position recesses are replaced by an annular groove 124 formed in the bearing face of the side walls of the cylinder 105, and the *b* position recesses are replaced by another annular groove 125. Groove 124 is arranged in communication with the cylinder 105 by means of a radial passage 126, and groove 125 is arranged in communication with the inner bore of the rotor by a radial passage 127. This construction may be preferable in some cases, particularly where the unit is designed for operation in both forward and reverse. In any case, I consider the constructions previously described to be preferred over the arrangement just described because the circumferentially arranged recesses do not provide a through passage between the highest and lowest pressure points as is the case with the grooves. Such a through passage may result in some loss of efficiency.

The fit of the rotor rings 22–29 inclusive on their respective shafts preferably is sufficiently free to permit movement of the rotor rings during the operation of the device. This also contributes to ease of assembly of the unit and assures that each rotor ring and associated piston can properly align itself within its cylinder under operating conditions. This also permits the maintenance of a very thin film of liquid between the inner bore of the rotors and their shafts. In order to keep the rotors properly centered on their shafts and prevent excessive wear on the ends of the pistons, I have found it advantageous to provide the construction particularly illustrated in Figs. 9 and 10. These views show a single piston rotor 108 with integral piston 109. The inner bore of the rotor is provided with a pair of annular grooves 110 communicating with the key slot 111. After long runs of some units under high pressure conditions, wear was noted on the shaft underneath the piston rotors and abutments. Apparently this is due to an inherent leakage flow over the face of the piston and underneath the piston which has a tendency to freeze the piston rotor to the shaft. The grooves 110 which I have described have been found to overcome this condition. They distribute the liquid completely around the inner bore of the piston rotor, preventing the development of a high pressure point. These grooves also assist in equalizing temperatures within the unit. The tips of the pistons ordinarily become hot spots inside the pump because all the leakage generates heat on this surface. Grooves similar to those shown at 110 in Figs. 9 and 10 can be used underneath the abutment rings 48–51 of Fig. 1 and 98 of Fig. 11.

I have described internal pressure balancing as achieved by the use of the recesses 43, 47, 100, 101, 102, 103 and 104 and external or static pressure balancing as achieved by the use of ducts 45, 46, 53 and 54. I have stated that the external balancing feature is particularly advantageous in multiple place units, that the internal balancing feature can be used to advantage by itself in either single or multiple place units, and that in multiple place units both the internal and external balancing features can be used to advantage in combination. Also, the external balancing feature can be used alone to advantage, particularly in multiple place units under certain conditions of operation. As long as end pressure is insufficient to squeeze out the film of oil or other liquid from between the interfaces of the rotor or abutment rings and the side walls of the cylinders, the external pressure balancing construction is effective without the use of the recesses of the internal balancing system. Under this condition the liquid film in effect preserves a channel to transmit the pressure so that it will be the same on both sides of the rotor and abutment rings. At the higher pressures, however, the liquid film will be squeezed out from between the interfaces, or it will be squeezed so thin as to be no longer effective in transmitting pressure. Under this condition, the internal pressure balancing recesses come into play, maintaining open pockets between the bearing surfaces to transmit the balancing pressures. Thus the internal pressure system "opens the door" so to speak to the external pressure system, and the two systems complement one another.

The terms and expressions which I have employed are used in a descriptive and not a limiting sense, and I have no intention of excluding such equivalents of the invention described or portions thereof, as fall within the purview of the claims.

I claim:

1. A rotary power unit comprising a casing having axially-aligned annular cylinders each of which has a fluid inlet and a fluid outlet, a rotor shaft carrying piston rotors with pistons slidably arranged in said cylinders to traverse the respective annular cylinders in rotary movement, bearings in said casing to receive said rotor shaft, said bearings arranged at each side of each of said axially-aligned cylinders, a rotary abutment arranged in said casing with its axis parallel to the axis of said rotor shaft, said abutment having recesses to clear said pistons as they pass the abutment, a series of recesses being provided in the side walls of said annular cylinders, said recesses being arranged circumferentially and a substantial number of said recesses being distributed around the outer circumference of the respective piston rotor and positioned to lie partly within and partly beyond such circumference, ducts extending from said rotor shaft bearings at each side of each of said axially-aligned cylinders, and a common passageway connecting all of said ducts.

2. A rotary power unit as defined by claim 1 in which at least some others of said recesses are distributed around the circumference of the rotor shaft and positioned to lie entirely within the outer circumference of the respective piston rotor and extend inwardly to intersect the circumference of the rotor shaft.

3. A rotary power unit as defined by claim 1 in which said series of circumferentially arranged recesses are positioned so that alternate recesses (1) lie partly beyond the outer circumference of the respective piston rotor and (2) extend inwardly to intersect the circumference of the rotor shaft.

4. A rotary power unit as defined by claim 1 in which said series of circumferentially arranged recesses are positioned at varying distances from the axis of the rotor shaft so that some of said recesses lie mainly within the outer circumference of the respective piston rotor and partly beyond such circumference, others of said recesses lie entirely within such circumference and extend inwardly to intersect the circumference of the rotor shaft, and still others of said recesses lie mainly outside the outer circumference of the rotor shaft and partly within such circumference.

5. A rotary power unit comprising a casing having at least one annular cylinder said cylinder having a fluid inlet and a fluid outlet, a rotor shaft carrying a piston rotor with a piston slidably arranged in said cylinders to traverse the cylinder in rotary movement, a rotary abutment arranged in said casing with its axis parallel to the axis of said rotor shaft, said abutment having a recess to clear the piston as it passes the abutment, a series of recesses being provided in the side walls of the cylinder, said recesses being arranged circumferentially in a series extending substantially entirely around the cylinder and at least some of said recesses being positioned to lie partly within the outer circumference of the piston rotor and partly beyond such circumference.

6. A rotary power unit as defined by claim 5 in which at least some of said recesses lie mainly within the outer circumference of the piston rotor and partly beyond such circumference.

7. A rotary power unit as defined by claim 5 in which at least some others of said recesses are distributed around the circumference of the rotor shaft and positioned to lie entirely within the outer circumference of the piston rotor and extend inwardly to intersect the circumference of the rotor shaft.

8. A rotary power unit as defined by claim 5 in which said series of circumferentially arranged recesses are positioned so that alternate recesses (1) lie partly beyond the outer circumference of the piston rotor and (2) extend inwardly to intersect the circumference of the rotor shaft.

9. A rotary power unit as defined by claim 5 in which said series of circumferentially arranged recesses are positioned at varying distances from the axis of the rotor shaft so that some of said recesses lie mainly within the outer circumference of the piston rotor and partly beyond such circumference, others of said recesses lie entirely within such circumference and extend inwardly to intersect the circumference of the rotor shaft, and still others of said recesses lie mainly outside the outer circumference of the rotor shaft and partly within such circumference.

10. A rotary power unit as defined by claim 5 in which said recesses are in the shape of a flat cone.

11. A rotary power unit as defined by claim 5 in which said recesses lie mainly within the outer circumference of the piston rotor and partly beyond such circumference and are elongated circumferentially of the rotor.

12. A rotary power unit as defined by claim 5 in which said recesses comprise two circumferential grooves of differential diameters lying mainly within the outer circumference of the piston rotor, one of said grooves communicating with the cylinder and the other of said grooves communicating with the rotor shaft.

13. A rotary power unit comprising a casing having at least one pair of annular cylinders arranged on spaced parallel axes, each of said cylinders having a fluid inlet and a fluid outlet, the outlet of one of said cylinders being connected to the inlet of the other, rotor shafts carrying piston rotors with pistons slidably arranged in said cylinders to traverse the respective cylinders in rotary movement, a rotary abutment arranged in said casing with its axis between, and parallel to, the axes of said rotor shafts, said abutment having a recess to clear the pistons as they pass the abutment, a series of recesses being provided in the side walls of each of said cylinders, said recesses being arranged circumferentially in a series extending substantially entirely around the cylinder of their respective rotor shafts and at least some of said recesses being positioned to lie partly within the outer circumference of their respective piston rotor and partly beyond such circumference.

14. A rotary power unit as defined by claim 13 in which at least some others of said recesses are distributed around the circumference of the rotor shaft and positioned to lie entirely within the outer circumference of the respective piston rotor and extend inwardly to intersect the circumference of the rotor shaft.

15. A rotary power unit as defined by claim 13 in which said series of circumferentially arranged recesses are positioned so that alternate recesses (1) lie partly beyond the outer circumference of the respective piston rotor and (2) extend inwardly to intersect the circumference of the rotor shaft.

16. A rotary power unit as defined by claim 13 in which said series of circumferentially arranged recesses are positioned at varying distances from the axis of the respective rotor shaft so that some of said recesses lie mainly within the outer circumference of the respective piston rotor and partly beyond such circumference, others of said recesses lie entirely within such circumference and extend inwardly to intersect the circumference of the rotor shaft, and still others of said recesses lie mainly outside the outer circumference of the rotor shaft and partly within such circumference.

References Cited in the file of this patent

UNITED STATES PATENTS

| | | |
|---|---|---|
| 142,696 | Holmes | Sept. 9, 1873 |
| 1,064,169 | Prall | June 10, 1913 |
| 1,096,186 | Nesmith | May 12, 1914 |
| 1,795,579 | Storey | Mar. 10, 1931 |
| 1,902,346 | Vogt | Mar. 21, 1933 |
| 1,984,664 | Teves | Dec. 18, 1934 |
| 2,464,481 | Berry | Mar. 15, 1949 |
| 2,495,088 | Berry | Jan. 17, 1950 |
| 2,536,486 | Berry | Jan. 2, 1951 |
| 2,541,010 | Ungar | Feb. 6, 1951 |

FOREIGN PATENTS

| | | |
|---|---|---|
| 107,591 | Australia | May 31, 1939 |
| 527,867 | Great Britain | Oct. 17, 1940 |